(12) United States Patent
Doi

(10) Patent No.: US 6,801,372 B2
(45) Date of Patent: Oct. 5, 2004

(54) RESIN COMPOSITION FOR LENS SHEET, LENS SHEET, AND PROJECTION SCREEN

(75) Inventor: Yasuhiro Doi, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 0 days.

(21) Appl. No.: 10/474,108
(22) PCT Filed: Dec. 21, 2001
(86) PCT No.: PCT/JP01/11277
§ 371 (c)(1), (2), (4) Date: Oct. 7, 2003
(87) PCT Pub. No.: WO02/091034
PCT Pub. Date: Nov. 14, 2002

(65) Prior Publication Data
US 2004/0125465 A1 Jul. 1, 2004

(30) Foreign Application Priority Data
Apr. 24, 2001 (JP) ........................ 2001-126650

(51) Int. Cl.$^7$ .................................. G02B 13/18
(52) U.S. Cl. .................................................. 359/742
(58) Field of Search .................................. 359/742, 743

(56) References Cited

U.S. PATENT DOCUMENTS 5,566,027 A 10/1996 Saitoh et al.

FOREIGN PATENT DOCUMENTS

| EP | 0376254 | 7/1990 |
|---|---|---|
| EP | 0522405 | 1/1993 |
| JP | 155203 | 6/2000 |

Primary Examiner—Scott J. Sugarman
(74) Attorney, Agent, or Firm—Ladas & Parry

(57) ABSTRACT

Provided is a resin composition for lens sheet, a lens sheet, and a projection screen which by defining the mechanical properties based on the consideration of the pressure and time factor actually applied to an ionizing radiation curable resin enables obtaining excellent images without, even if any pressure has been applied to the lens sheet surface, causing crush of the configuration of the lens. The lens sheet is molded using an ionizing radiation curable resin composition in which the compression modulus of elasticity is greater than 0 MPa and smaller than 840 MPa and the creep deformation factor is greater than 0% and smaller than 57%; or the compression modulus of elasticity is greater than 840 MPa and smaller than 3500 MPa and the creep deformation factor is greater than −10% and smaller than 20%; or when E (MPa) represents the compression modulus of elasticity and C (%) represents the creep deformation factor, the ionizing radiation curable resin composition has a compression modulus of elasticity and creep deformation factor that have the relationship of $$C < -2 \times 10^{-2} E + 63 \text{ and } C > -2.6 \times 10^{-3} E + 3.$$

5 Claims, 7 Drawing Sheets

FRESNEL LENS

LENTICULAR LENS

PROJECTION SCREEN

RESIN COMPOSITION FOR LENS SHEET, LENS SHEET, AND PROJECTION SCREEN

TECHNICAL FIELD

The present invention relates to an ionizing radiation curable resin composition that forms a lens sheet such as a Fresnel lens sheet, a lens sheet whose lens portion has been formed using that composition, and a projection screen that is equipped with that lens sheet.

BACKGROUND ART

Up to now, a two-sheet structure of projection screen that has been prepared by combining a lenticular lens and a Fresnel lens with each other is general as the projection screen. In this structure, to bond the both lenses to each other, it is practiced to assemble a lenticular lens sheet, which has been warped beforehand, to a planar Fresnel lens sheet in such a way as to press the former lens sheet against the latter lens sheet as illustrated in FIG. 1. Accordingly, a pressure is produced at a portion of contact between the assembled both lens sheets. For example, as illustrated in FIG. 6, in the case of a screen in which the lens surface of the lenticular lens the ridge of that has been vertically formed has been superposed upon the lens surface of the circular Fresnel lens, at the left and right parts of the screen line contacts mainly occur while at the vertical end parts of the screen mainly point contacts occur. In this projection screen, on the side of the Fresnel lens sheet that opposes the lenticular lens sheet, the portions each of that is substantially triangular in cross section and each apex point of that sharpens are concentrically arrayed. In the surface of the lenticular lens sheet that opposes the Fresnel lens sheet, the cross-sectional configuration thereof is formed into a semicircular-columnar configuration. Accordingly, the material (resin composition) constituting the lens surface of the Fresnel lens sheet having the sharpening forward ends at their portions of contact needs to have a predetermined value or more of mechanical property with respect to the crush. This is because in case the lens surface is easily crushed with the above-described pressure, when that lens sheet has been used as the projection screen, excellent images cannot be obtained.

With respect to the above-described problems, in the specification of Japanese Patent Application Laid-Open No. 10-10647, there is disclosed a lens sheet the configuration stability of that is excellent over a wide temperature range and the optical properties of that can be maintained as are by setting the elastic modulus of the active energy radiation curable resin used in the lens portion of the lens sheet to be in the range of from 80 to 20000 kg/cm$^2$ within a temperature range of from −20 to +40° C.

Also, in Japanese Patent Application No. 2000-036435, the dissipation factor tan δ of the dynamic visco-elasticity after curing of the ionizing radiation curable resin constituting the lens is set to fall within a predetermined range considering a case where dynamic force has been applied to the lens sheet to thereby provide a resin composition for lens sheet that has no strain built therein, flexibility, and excellent restorability.

However, in the specification of the above-described Japanese Patent Application Laid-Open No. 10-10647, the elastic modulus that is defined in JIS K-7113 is adopted. This elastic modulus is the one that is obtained by determining the value of the tensile elastic modulus through the use of a flat film, and therefore cannot be said to be the one that faithfully reproduces in an environment where an actual ionizing radiation curable resin is placed (receives a compression force).

Also, the pressure that when the resin composition is actually used as the projection screen occurs between the both lenses has a great length of duration. Namely, part of the resin composition for lens has a restoration force that acts to press that pressure back by degrees. Accordingly, when designing and selecting the resin composition for lens, it is necessary to take a time factor into consideration that should be involved in the mechanical properties of the resin composition.

DISCLOSURE OF THE INVENTION

Thereupon, the present invention has an object to provide a resin composition for lens sheet, the lens sheet, and a projection screen using it, which, by defining the mechanical properties based on the consideration of the pressure and time factor an ionizing radiation curable resin composition actually receives, even when any pressure is applied to the surface of the lens sheet, can obtain excellent images without having the lens configuration crushed due to that pressure.

Hereinafter, the present invention will be explained. In an aspect of the present invention, the above-described problems are solved by an ionizing radiation curable resin composition, the ionizing radiation curable resin composition forming a lens portion of a lens sheet, wherein the compression modulus of elasticity is greater than 0 MPa and smaller than 840 MPa; and the creep deformation factor is greater than 0% and smaller than 57%. The "elastic modulus" and "creep deformation factor" referred to here each mean a value that has been obtained by measurement performed using a "small degree of hardness tester" that will be described later.

Also, in a second aspect of the present invention, the above-described problems are solved by an ionizing radiation curable resin composition, the ionizing radiation curable resin composition forming a lens portion of a lens sheet, wherein the compression modulus of elasticity is greater than 840 MPa and smaller than 3500 MPa; and the creep deformation factor is greater than −10% and smaller than 20%.

Further, in a third aspect of the present invention, the above-described problems are solved by an ionizing radiation curable resin composition, the ionizing radiation curable resin composition forming a lens portion of a lens sheet, wherein when E (MPa) represents the compression modulus of elasticity and C (%) represents the creep deformation factor, the ionizing radiation curable resin composition has a compression modulus of elasticity and creep deformation factor that have the relationship of $$C < -2 \times 10^{-2} E + 63 \text{ and } C > -2.6 \times 10^{-3} E + 3$$

According to each of these aspects of the present invention, it is possible to obtain an ionizing radiation curable resin composition that in case it is used for molding a lens surface, even when any pressure is applied to the surface of the lens sheet, can obtain excellent images without having the lens configuration crushed due to that pressure.

In a fourth aspect of the present invention, the Fresnel lens sheet may be constructed as a Fresnel lens sheet whose lens surface is formed of the ionizing radiation curable resin composition as described in one of the above-described aspects.

Further, in a fifth aspect of the present invention, the projection screen may be constructed as a projection screen that is equipped with the Fresnel lens sheet according to the above-described aspect.

The above-described functions and advantages of the present invention will be made clear from the embodiments that will be explained next.

BEST MODE FOR CARRYING OUT THE INVENTION

As a result of having studied various testing methods, in order to measure the mechanical properties additionally involving the time factor of the ionizing radiation curable resin composition, the inventor of this application has found out that the small degree of hardness measuring device is the most suitable. Also, by adopting the elastic modulus (E) and creep deformation factor (C) as the measured values obtained by measurement performed using the above-described small degree of hardness measuring device, the inventor has found out that it is possible to selectively determine the ionizing radiation curable resin composition for fresnel lens sheet that can be used with no problems arising from the pressure that it receives when it is used in the relevant projection screen. Hereinafter, sequential explanations will be given of the details of the small degree of hardness testing device, the testing-sample-preparing method, the measuring conditions, the measuring items, the crush evaluation on the Fresnel lens molded using the ionizing radiation curable resin composition that has been used in the above-described tests, the measured results of these tests, and the analyses results thereof.

[Embodiments]

(1) Small degree of hardness testing device

Figure 7:
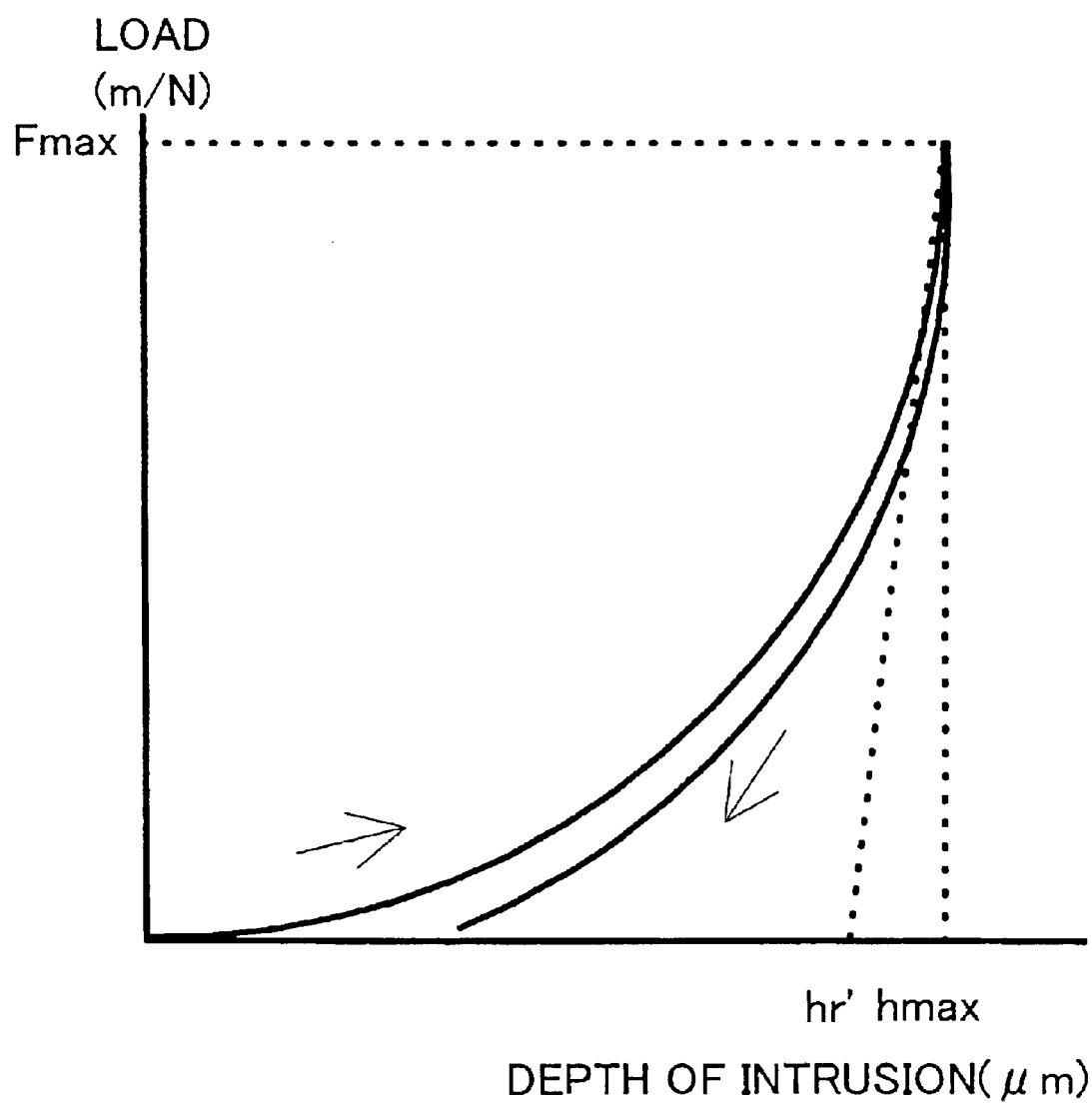
FIG. 7 is a view illustrating the load/the intrusion-depth curve that has been obtained from the conducting of a universal-hardness test.

The small degree of hardness testing device that is used in the embodiment of the present invention of this application is a type of universal-hardness testing device and, in the market, is available as the "Fisher' scope H-100V" produced by Fisher. This testing device is originally the one that presses an indenter into the surface of a sample and directly reads the intruding depth of the recess in a state where a predetermined magnitude of load has been applied to thereby determine the universal hardness. The inventor of this application, in this testing device, caused the load applied to the indenter to vary under predetermined conditions and measured various kinds of mechanical properties of the sample (resin composition). Using this testing device, it is possible to measure various kinds of properties (the properties values of the universal hardness HU, the plasticity hardness $HU_{PLAST}$, the flow behavior, the creep behavior, the restoration of elasticity behavior, etc.). In this testing device, as the indenter, a Vickers pyramid indenter the dimensional precision of that is high in particular is used, with the result that a load/intrusion-depth curve such as that illustrated in FIG. 7 is measured. The measured data is processed by a computer equipped to the tester, with the result that there are obtained an "elastic deformation straight line", such as indicated in a broken line in the Figure, and a "amount of plastic deformation" hr' that is estimated therefrom and represents the intrusion depth under a testing load, such as that indicated in a broken line in the Figure. Further, not only the relationship between the universal hardness and the intrusion depth but also other relationship can be simply illustrated. Regarding the details of such theoretical mutual relationships between the tested values, it is recommended to refer to the monthly publication "Material-Testing Technology" April issue, Vol. 43, No. 2, in the year of 1998 and to the separate volume "Evaluation of Material Properties by Universal-hardness Test" (Cornelia Heermant, Dieter Dengel (translated) by Katayama Shigeo and Satoh Shigeo).

Incidentally, this testing method is registered as the "Testing Method on Metallic Materials" under a German Testing Standard (DIN standard) 50359-1. Also, there is a proposed standard that is defined as an ISO Standard and the Committee draft of that is published in 1999.

(2) Testing Sample Preparing Method

An ionizing radiation curable resin composition, which becomes a sample, is coated onto a Fresnel lens molding die to a thickness of 200 μm. The die temperature at this time is maintained at a temperature of 40 to 42° C. while the resin temperature at a temperature of 42° C. Subsequently, ultraviolet rays are radiated onto the thus-coated ionizing radiation curable resin composition through the use of a molding lamp (the metal halide lamp: produced by Japan Storage Battery Co., Ltd.) under the radiation condition that the UV dose is 2000 $mJ/cm^2$; and the peak intensity is 250 $mW/cm^2$, to thereby cure that resin composition. It thereafter is exfoliated from the die and was used as the testing sample.

(3) Measuring Conditions

While, as described above, in the test for universal-hardness, the indenter is pressed into the surface of the sample and, with the intrusion load being applied to it, the intrusion depth of the recess is read to thereby determine the hardness, the inventor of this application gradually increased or decreased the intrusion load based on the use of the indenter up to, or down to, a predetermined value and thereby measured various kinds of mechanical properties of the sample resin composition. Incidentally, here, as the indenter, there was used a tungsten-carbide ball indenter having a diameter of 0.4 mm. Hereinafter, concrete measuring conditions will be explained with reference to FIG. 2.

Figure 1:
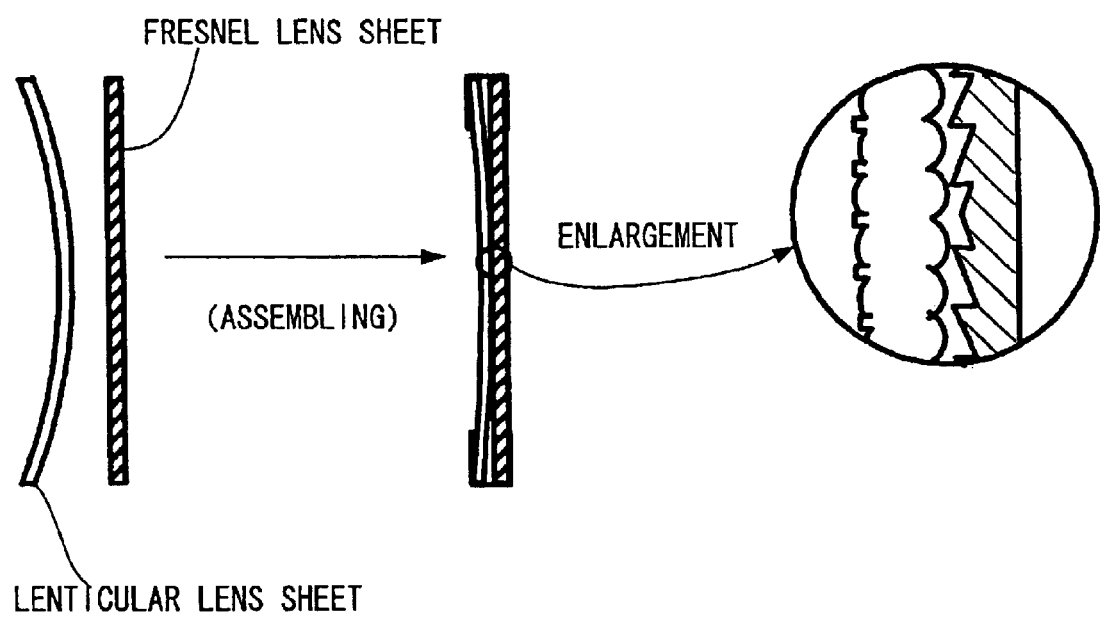
FIG. 1 shows three pieces of views each illustrating a state where a lenticular lens sheet is assembled to a Fresnel lens sheet to thereby prepare a screen.
Figure 2:
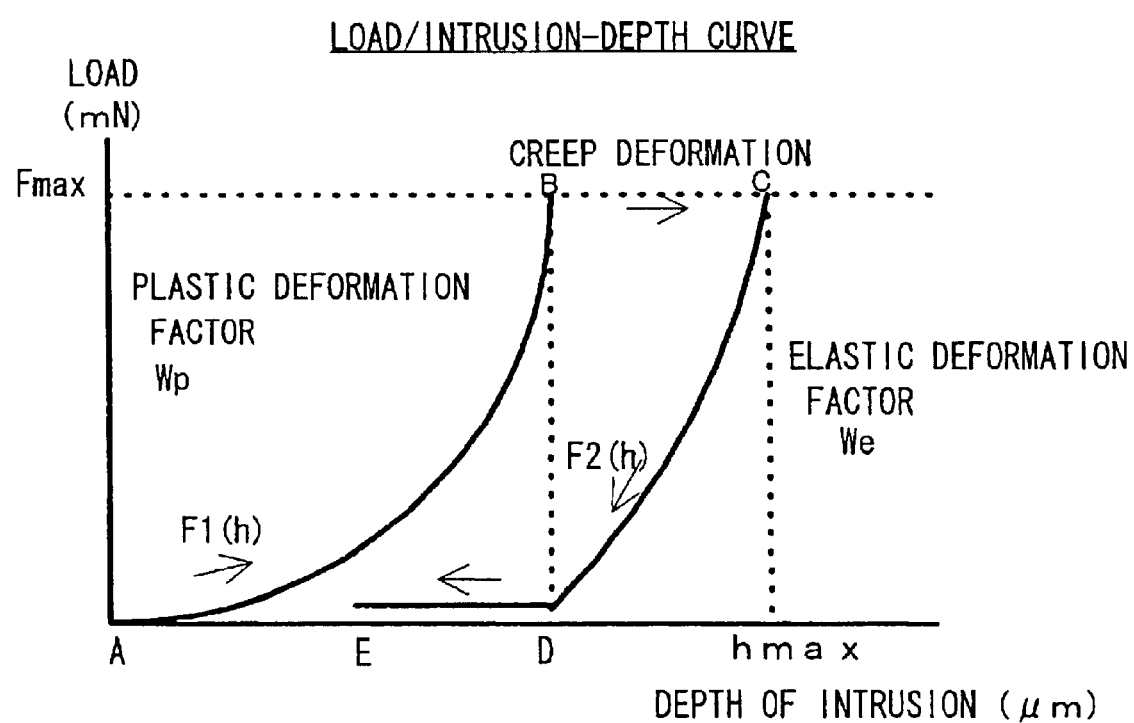
FIG. 2 is a graphic diagram illustrating a load/intrusion-depth curve.
Figure 3:
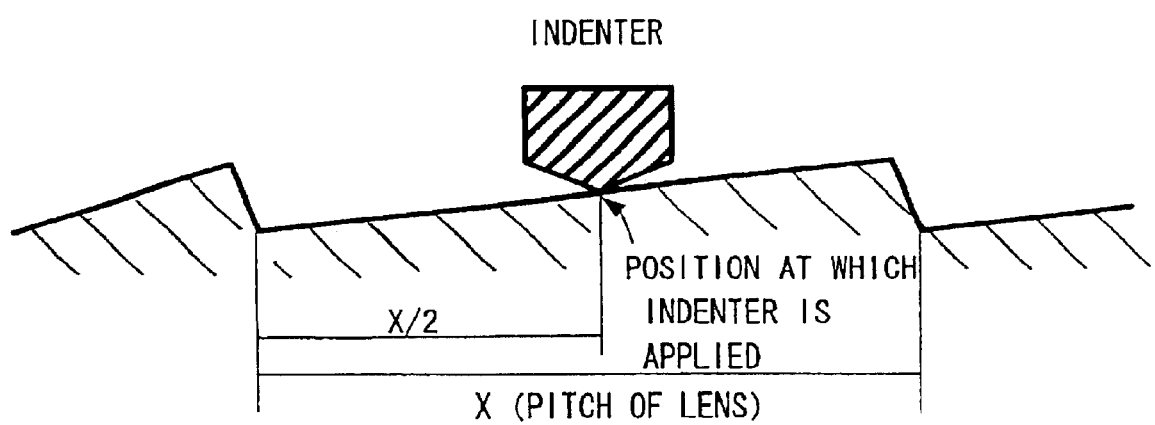
FIG. 3 is a view illustrating the position at which an indenter is intruded into a sample lens.

In FIG. 2, the point A indicates the state prior to the start of the test. Here in this position A, the load (ordinate axis) is not applied and therefore has a value of 0, while the intrusion depth of the indenter (abscissa axis) is also similarly 0 in value. At the point A, the forward end of the lower end portion of the indenter is in a state of very slightly contacting with the surface of the sample. The position of the forward end of the lower end portion of the indenter was set, while it is being confirmed using a microscope, so that it may fall upon the center position of the lens-section length in the vicinity 2 to 3 mm away from the center of the Fresnel lens sample (see FIG. 3).

From this state, by dividing the intrusion into 100 stages at intervals of 0.1 second, the load that is applied to the indenter was gradually increased until the load became 20 mN (from the point A to the point B in FIG. 2). In FIG. 2, the point B represents the time of the maximum load F max (here 20 mN) applied, i.e. the time of the maximum deformation. Under this load, the indenter was maintained as was for 60 seconds, whereby the so-called "creep deformation" was caused to the sample (from the point B to the point C). In FIG. 2, the depth of intrusion (C-B) μm represents the amount of creep deformation. Subsequently, the indenter was raised in 40 stages at intervals of a second until the minimum load of the tester (0.4 mN) was reached (from the point C to the point D). Further, in the state of that minimum load of the tester (0.4 mN), the indenter was maintained as was for 60 seconds (from the point D to the point E). In FIG. 2, the depth of intrusion (D-E) μm represents the amount of creep deformation at the time of the minimum load applied; the depth of intrusion (E-A) μm represents the residual amount of deformation; and further the depth of intrusion (hmax-E) μm represents the restored amount of deformation.

The reason for applying the load to the sample resin composition through the use of the ball indenter is that of the combination of the lenticular lens and Fresnel lens the crushed portions are the portions of point contact wherein the lenticular lens configuration is vertically laid and the Fresnel lens configuration is horizontally laid, and that therefore the point load can excellently reproduce the actual phenomenon. Also, the reason whey the maximum load Fmax has been set to be 20 mN is that because the pressure contact between the both lenses is considerably low and the actual measurement thereof is difficult, the requirement for causing, at the maximum amount of deformation, the reference resin to deform to an extent of 10 μm due to the displacement of it has been set as the maximum magnitude of load. The reason for having made the maximum amount of deformation approximately 10 μm or so is based on the opinion (refer to the paragraph "0018" in the specification of Japanese Patent Application Laid-Open Publication No. 2000-155203) of "the amount of deformation of the lens ordinarily has a permitted deformation of up to 0.01 mm at its outer-peripheral part because the lens even at that time does not permit any light from the light source to pass therethrough" disclosed in that specification.

(4) Measuring Items

The parameters for specifying the mechanical properties of the resin composition in the present invention, i.e. the elastic modulus (E) and the creep deformation factor (C) are the ones that can be analyzed from the above-described load displacement loop (FIG. 2). Here, the procedure under the preceding item was repeated three times, whereby the elastic modulus (E) and creep deformation factor (C) that were obtained as the measuring items each time had their values averaged to arithmetical-mean values. Thereby, these values were recorded as the measured values.

The elastic modulus (E) and the creep deformation factor (C) are expressed as follows.

(a) Elastic Modulus: E $$E = 1/(2(hr(R-hr))^{1/2} \cdot (hmax)\Delta h/\Delta F - (1-vw)/Ew)$$
$$= 1/(5.586 \cdot hr \cdot (hmax)\Delta h/\Delta F - 7.813 \times 10^{-7})$$

where hr represents the intersection (the unit: mm) of the tangential line to the load displacement curve with the intrusion-depth axis when the testing load is maximum (the region of decrease in load, the region enclosed by the points C, D, and hmax in FIG. 2).

Also, Δ hmax/Δ represents the inverse rise in the load displacement curve when the testing load is maximum (the region of decrease in load, the region enclosed by the points C, D and h max in FIG. 2). The unit is mm/N.

Further, vw represents the Poisson's ratio (=0.22) of the tungsten carbide; Ew represents the elastic modulus (5.3 ×10⁵ N/mm²) of the tungsten carbide; and R represents the radius (0.4 mm) of the ball indenter.

Just for reference, the elastic modulus E in the case of having used the Vickers indenter (diamond) is expressed as follows.

$$E=1/(4 \tan(2/\alpha)hr \cdot (hmax)\Delta h/\Delta F/\rho^{1/2} - (1-vdia)/Edia)$$

where α represents the apex angle of the Vickers indenter that is 136°; v dia represents the Poisson's ratio (=0.25) of the diamond; and Edia represents the elastic modulus (1.2× 10⁶ N/mm²) of the diamond.

(b) Creep Deformation Factor: C $$C=(h2-h1) \cdot 100/h1$$

where h1 represents the depth of intrusion when the load has reached the testing load (here 20 mN) maintained at a fixed value (the point B in FIG. 2); and h2 represents the depth of intrusion after the lapse (the point C in FIG. 2) of a predetermined length of time (60 seconds) while that testing load is maintained as is. The unit is mm.

(5) Evaluation on Crush: The Fresnel lens sheet that has been molded from the ionizing radiation curable resin composition the elastic modulus (E) and creep deformation factor (C) of that were measured above was jointly combined with a predetermined piece of lenticular lens sheet, and four sides thereof were fixed using a tape. Then each assembly was fitted into a corresponding different TV size of wooden frame and was made up into a TV set, the white screen of which was observed with the naked eyes. After the lapse of one hour, the Fresnel sheets each of that was crushed was recorded as the mark "●" while the Fresnel lens sheets each of that was recognized as being free of crush was recorded as the mark "○". (See FIG. 4).

Figure 4:
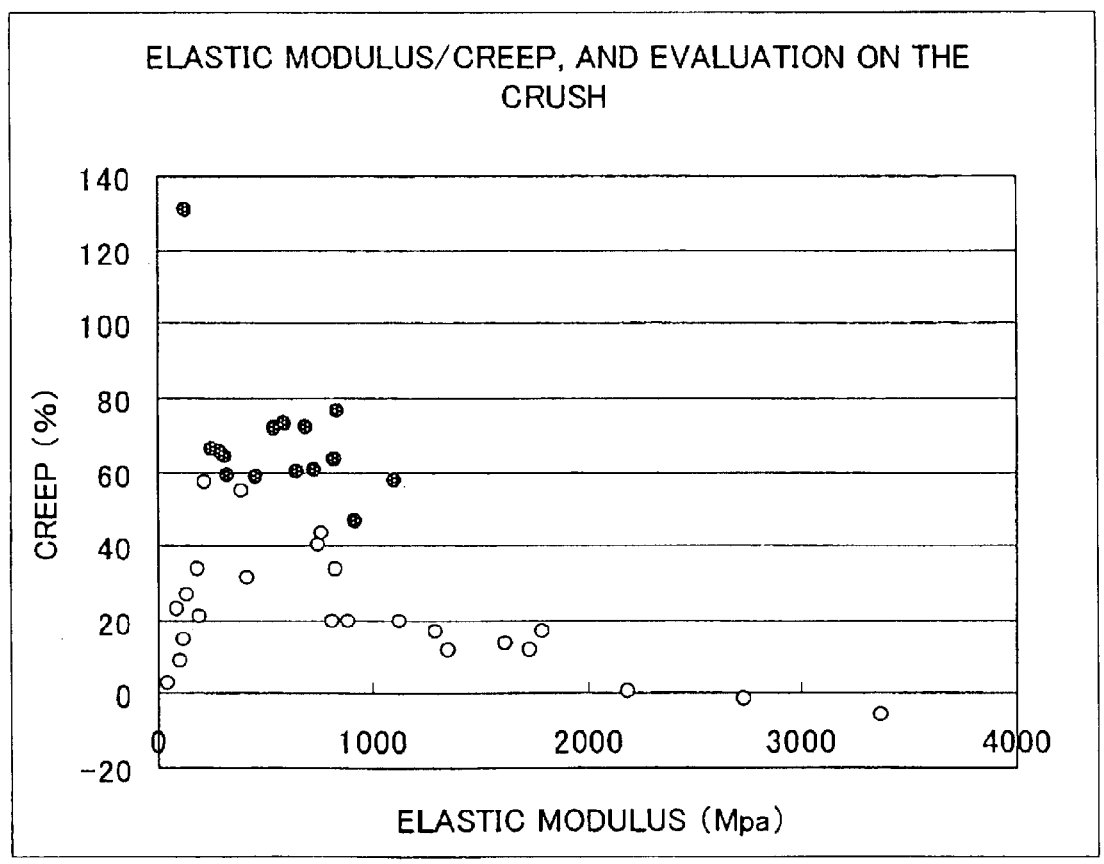
FIG. 4 is a graphic diagram illustrating the relationship of the elastic modulus/creep deformation factor to the evaluation on the crush.

(6) Test results: The elastic modulus (Y) and creep deformation factor (C) of each ionizing radiation curable resin composition and the on-crush evaluated results of the Fresnel lens sheets each molded from a corresponding one of ionizing radiation curable resin compositions are collectively shown in Table 1. Also, with the elastic modulus (E) and creep deformation factor (C) being plotted along the abscissa and ordinate axis, the on-crush evaluated results of test are represented as the mark "○" and "●" as above, which are shown in FIG. 4.

TABLE 1

| Sample number | refractive index (23° C., D rays) | elastic modulus (MPa) | creep deformation factor (%) | evaluation on crush |
|---|---|---|---|---|
| 1 | 1.553 | 759.3 | 43.87 | ○ |
| 2 | 1.553 | 1290 | 16.98 | ○ |
| 3 | 1.553 | 814.5 | 19.75 | ○ |
| 4 | 1.553 | 1729 | 12.11 | ○ |
| 5 | 1.552 | 2186 | 0.77 | ○ |
| 6 | 1.553 | 1618 | 13.55 | ○ |
| 7 | 1.551 | 458.6 | 58.68 | ● |
| 8 | 1.551 | 745.5 | 40.51 | ○ |
| 9 | 1.551 | 885.9 | 19.79 | ○ |

TABLE 1-continued

| Sample number | refractive index (23° C., D rays) | elastic modulus (MPa) | creep deformation factor (%) | evaluation on crush |
|---|---|---|---|---|
| 10 | 1.551 | 1126 | 19.65 | ○ |
| 11 | 1.551 | 725.6 | 60.79 | ● |
| 12 | 1.551 | 830.4 | 33.84 | ○ |
| 13 | 1.551 | 1347 | 12.00 | ○ |
| 14 | 1.553 | 2733 | −1.000 | ○ |
| 15 | 1.553 | 1788.4 | 17.10 | ○ |
| 16 | 1.553 | 3365 | −5.654 | ○ |
| 17 | 1.551 | 286.5 | 65.31 | ● |
| 18 | 1.551 | 216.9 | 57.56 | ○ |
| 19 | 1.551 | 251.8 | 66.25 | ● |
| 20 | 1.551 | 307.4 | 64.31 | ● |
| 21 | 1.551 | 1100 | 57.85 | ● |
| 22 | 1.550 | 922.5 | 47.24 | ● |
| 23 | 1.550 | 691.3 | 72.27 | ● |
| 24 | 1.552 | 647.2 | 60.37 | ● |
| 25 | 1.552 | 817.5 | 63.65 | ● |
| 26 | 1.552 | 321.6 | 59.38 | ● |
| 27 | 1.552 | 538.0 | 72.16 | ● |
| 28 | 1.553 | 585.2 | 73.27 | ● |
| 29 | 1.551 | 837.4 | 76.48 | ● |
| 30 | 1.552 | 411.85 | 31.531 | ○ |
| 31 | 1.550 | 132.2 | 26.81 | ○ |
| 32 | 1.553 | 79.58 | 23.25 | ○ |
| 33 | 1.552 | 190.0 | 21.30 | ○ |
| 34 | 1.551 | 95.29 | 8.859 | ○ |
| 35 | 1.550 | 128.0 | 130.89 | ● |
| 36 | 1.550 | 37.8 | 3.03 | ○ |
| 37 | 1.552 | 118.36 | 14.56 | ○ |
| 38 | 1.552 | 392.2 | 55.0 | ○ |
| 39 | 1.551 | 183.4 | 33.83 | ○ |

(7) Analysis of Test Results: The inventor of this application made his analysis of the above-described test results and as a result came to the following perceived conclusion. First, he classified the tested ionizing radiation curable resin compositions into a group of ones the elastic moduli of that each are low (soft) and the other group of ones the elastic moduli of that each are high (hard). And he has found out that, in the case of the soft group, it is possible to obtain the lens having no problems with crushes when the elastic modulus E is made greater than 0 MPa and smaller than 840 MPa and the creep deformation factor is made greater than 0% and smaller than 57%, or preferably greater than 3% and smaller than 55%, or most preferably when the elastic modulus E is made greater than 38 MPa and smaller than 412 MPa and the creep deformation factor is made greater than 3% and smaller than 55%. Also, in the case of the hard group, he has found out that the lens having no problems with the crushes can be obtained when the elastic modulus is made greater than 840 MPa and smaller than 3500 MPa while the creep deformation factor is made greater than −10% and smaller than 20%, or more preferably made greater than −6% and smaller than 20%.

Figure 5:
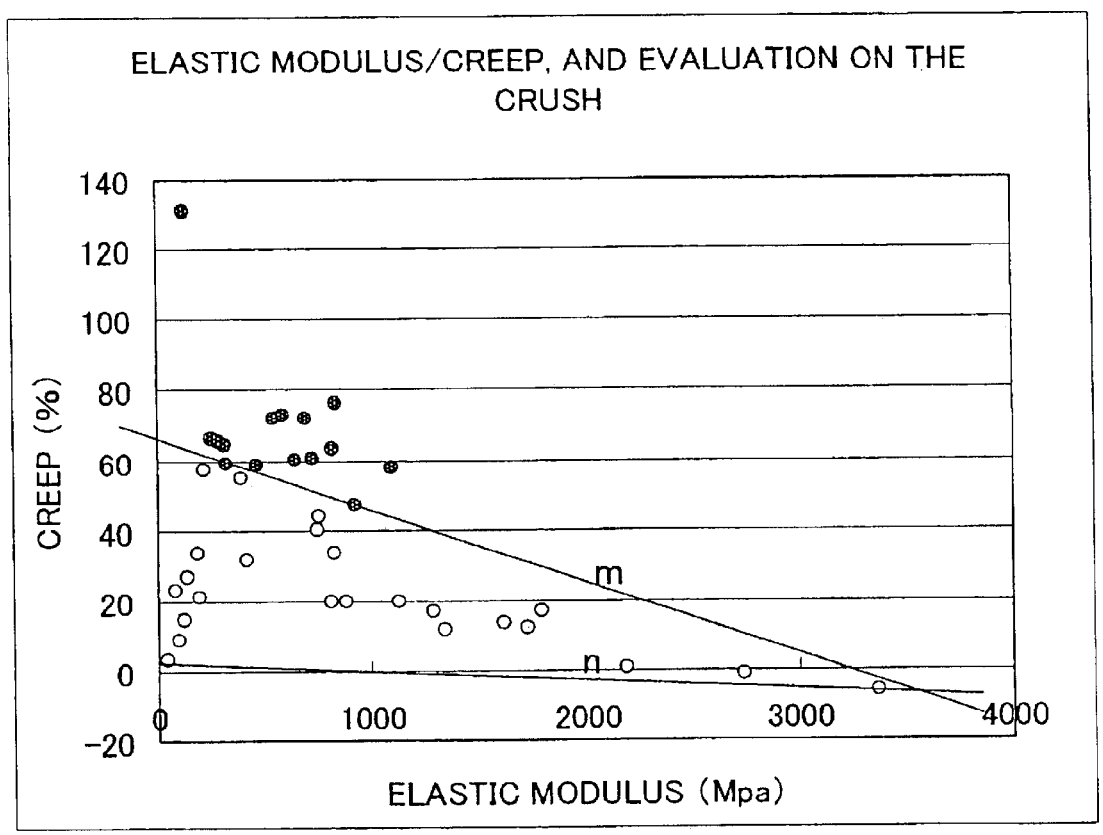
FIG. 5 is a graphic diagram illustrating, when in FIG. 4 attention is directed only towards the relationship between the two of the elastic modulus E and the creep deformation factor C, the range that enables obtaining a lens involving no problems with the crush.
Figure 6:
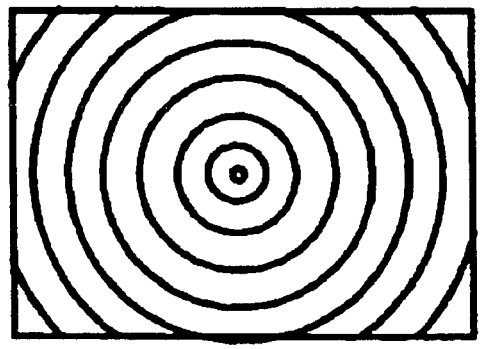
FIG. 6 shows three pieces of views each illustrating a circumstance where when the Fresnel lens and the lenticular lens have been superposed one upon the other portions of contact occur.
Figure 6:
Figure 6:
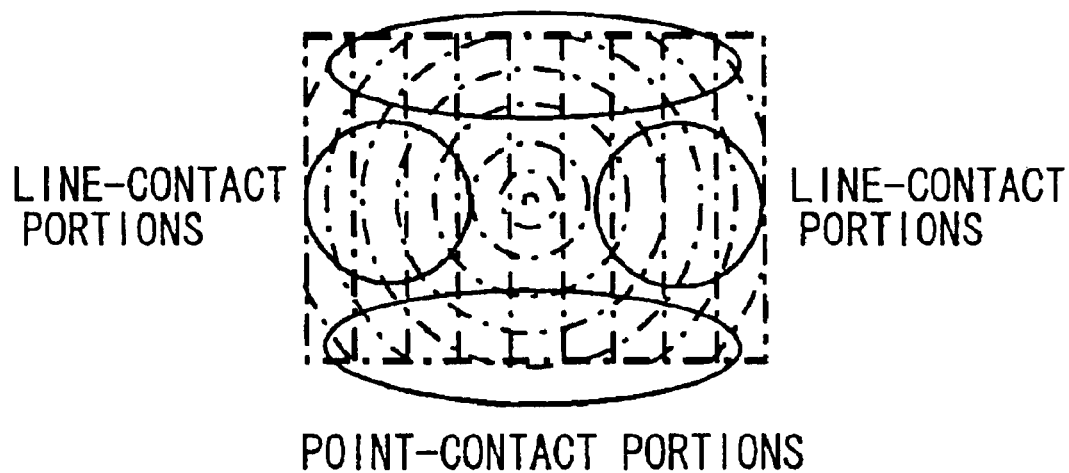

Also, he has found out that with attention being directed only toward the relationship between two of the elastic modulus E and creep deformation factor C of the ionizing radiation curable resin composition, if using for molding the ionizing radiation curable resin composition having the relationship of $C<-2\times10^{-2}E+63$ and $C>-2.6\times10^{-3}E+3$ (the area enclosed by the straight lines m, n and E=0 in FIG. 5), it is possible to obtain the lens having no problems with the crushes.

Incidentally, in the foregoing description, an explanation has been given of the ionizing radiation curable resin composition that is used to mold the Fresnel lens sheet used for the projection screen in combination with the lenticular lens sheet. However, the technical idea of the invention of this application is not limited to that but can be applied to any optical lens that is molded from other resin composition, the forward end in the lens configuration of that sharpens, and the forward end portion of that receives pressure in the direction of its being crushed.

Also, the present invention is not limited to the above-described embodiment but permits suitable changes to be made without departing from, or running counter to, the subject matter or idea of the present invention readable from the scope of the claims and the entire specification. Resin compositions for lens sheet, the lens sheets, and projection screens resulting from such changes are also included in the technical scope of the present invention.

INDUSTRIAL APPLICABILITY

As has been explained above, by setting the elastic modulus E and creep deformation factor C of the ionizing radiation curable resin composition each to within a range between predetermined values with the pressures actually received and the time factors being taken into account, even when any pressure has been applied to the surface of the lens sheet having been molded from that ionizing radiation curable resin composition, it is possible to obtain excellent images without causing any crush of the lens configuration.

What is claimed is:

1. An ionizing radiation curable resin composition, the ionizing radiation curable resin composition forming a lens portion of a lens sheet, wherein a compression modulus of elasticity is greater than 0 MPa and smaller than 840 MPa; and a creep deformation factor is greater than 0% and smaller than 57%.

2. An ionizing radiation curable resin composition, the ionizing radiation curable resin composition forming a lens portion of a lens sheet, wherein a compression modulus of elasticity is greater than 840 MPa and smaller than 3500 MPa; and a creep deformation factor is greater than −10% and smaller than 20%.

3. An ionizing radiation curable resin composition, the ionizing radiation curable resin composition forming a lens portion of a lens sheet, wherein, when E (MPa) represents a compression modulus of elasticity and C (%) represents a creep deformation factor, the ionizing radiation curable resin composition has a compression modulus of elasticity and creep deformation factor that have a relationship of $$C<-2\times10^{-2}E+63 \text{ and } C>-2.6\times10^{-3}E+3.$$

4. A Fresnel lens sheet having a lens surface formed of the ionizing radiation curable resin composition as described in one of claims 1 to 3.

5. A projection screen equipped with the Fresnel lens sheet as described in claim 4.

* * * * *